(12) United States Patent  
Bambenek et al.

(10) Patent No.: US 8,532,873 B1
(45) Date of Patent: Sep. 10, 2013

(54) SYSTEM TO REMOTELY UNLATCH A PICKUP BOX TAILGATE

(71) Applicant: Ford Global Technologies, LLC, Dearborn, MI (US)

(72) Inventors: Charles Gregory Bambenek, Northville, MI (US); Bhupendra A. Patel, Canton, MI (US); David Manuel Rogers, Southfield, MI (US); Thomas M. Herline, Canton, MI (US)

(73) Assignee: Ford Global Technologies, LL, Dearborn, MI (US)

( * ) Notice: Subject to any disclaimer, the term of this patent is extended or adjusted under 35 U.S.C. 154(b) by 0 days.

(21) Appl. No.: 13/674,502

(22) Filed: Nov. 12, 2012

(51) Int. Cl.
*G06F 7/00* (2006.01)

(52) U.S. Cl.
USPC ........ 701/36; 296/26.04; 296/26.08; 340/687

(58) Field of Classification Search
USPC ............ 701/36; 296/26.1, 26.04, 26.08, 296/26.07, 26.09, 26.11, 50, 56, 61, 62, 57.1, 296/98, 100.1, 100.04, 100.06, 100.07, 100.08, 296/100.17, 180.1; 340/687
See application file for complete search history.

(56) References Cited

U.S. PATENT DOCUMENTS

| | | | |
|---|---|---|---|
| 6,769,729 B1 | 8/2004 | Bruford et al. | |
| 6,793,263 B1 | 9/2004 | Bruford et al. | |
| 6,874,837 B2 | 4/2005 | Bruford et al. | |
| 7,547,055 B2 | 6/2009 | Stratten | |
| 7,551,958 B2 | 6/2009 | Libbus et al. | |

*Primary Examiner* — McDieunel Marc
(74) *Attorney, Agent, or Firm* — Ray Coppiellie; Price Heneveld LLP

(57) ABSTRACT

A pickup truck includes a tailgate that is movable between open and closed positions. A powered latch provides for remote release of the latches of the tailgate. The tailgate is biased from the closed position towards the open position such that release of the latch causes the tailgate to shift automatically from the closed position to the open position.

18 Claims, 8 Drawing Sheets

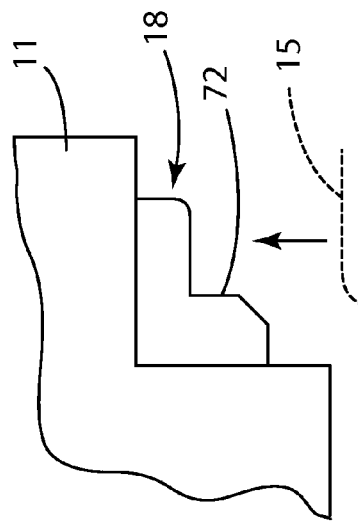
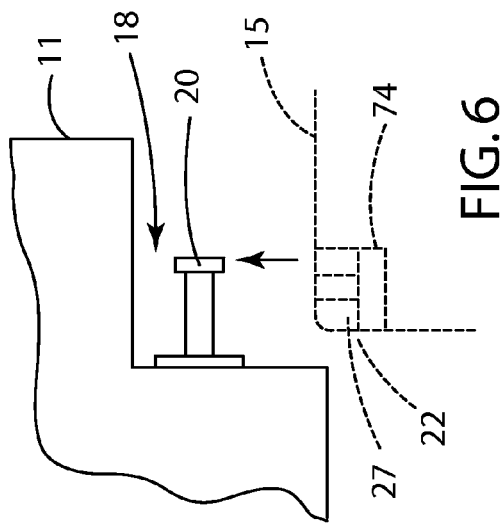
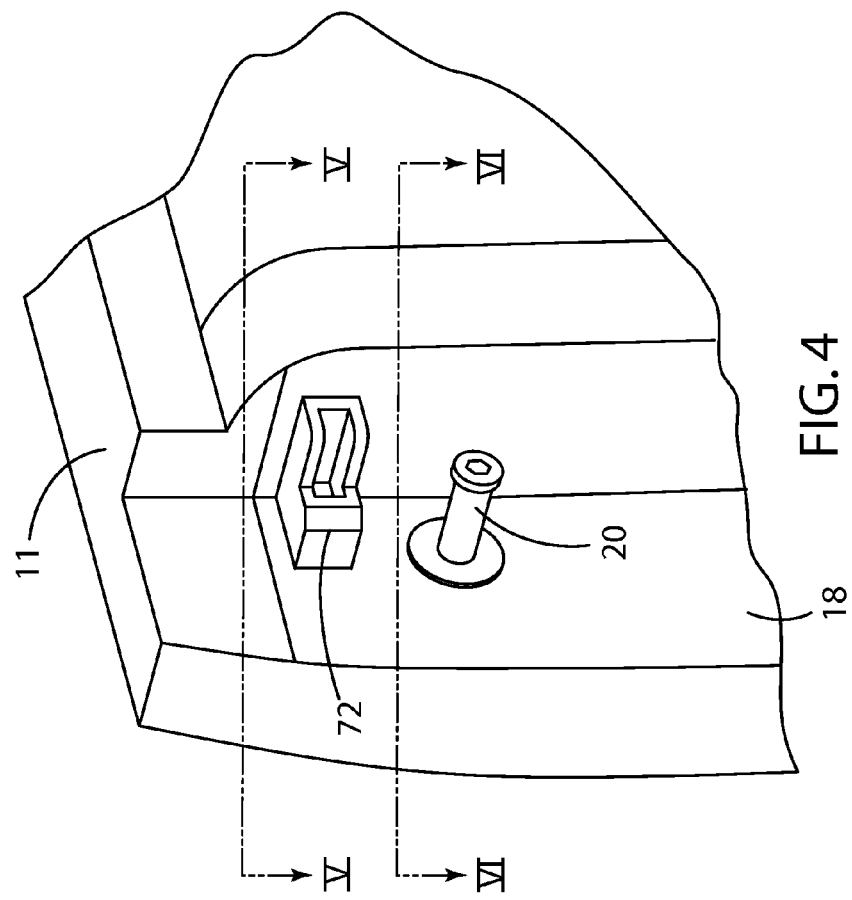

SYSTEM TO REMOTELY UNLATCH A PICKUP BOX TAILGATE

FIELD OF THE INVENTION

The present invention relates to a latch release for tailgates of pickup trucks and specifically to a remote unlatch arrangement for tailgates of pickup trucks.

BACKGROUND OF THE INVENTION

Pickup trucks typically include a latching tailgate that swings between an upright closed/latched position to a horizontal open position to selectively provide access to the truck box. Known latch arrangements may include strikers that are mounted to the vehicle structure, and extend inwardly from the vertically extending rear edges of the sidewalls of the truck bed. The strikers engage latches in the tailgate when the tailgate is in a closed position to thereby retain the tailgate in the closed position. A handle on the tailgate can be pulled to an open position to thereby unlatch the tailgate, permitting the tailgate to be pulled open manually by a user.

SUMMARY OF THE INVENTION

One aspect of the present invention is a pickup truck having a powered latch system for selective release of a tailgate of the pickup truck. The pickup truck includes a vehicle structure having an upwardly-facing box or bed, and upstanding sidewalls extending along opposite sides of the box structure to define a generally upright rear box opening. The truck also includes a tailgate that is movably mounted to the vehicle structure for movement between an upright closed position wherein the tailgate substantially closes off the opening, and an open position permitting access to the bed or box through the rear box opening. The truck also includes first and second latches having first and second latch members, respectively, that are movable between latched and released positions to releasably retain the tailgate in the closed position when the first and second latches are in their latched positions. At least one resilient member interacts with the tailgate and biases the tailgate towards the open position when the tailgate is in the closed position and the latches are in the latched position. The truck further includes at least one powered actuator operably connected to the first and second latches to selectively shift the first and second latches from their respective latched positions to their respective released positions, and the tailgate automatically shifts from the upright closed position to the open position upon actuation of the powered actuator. The powered actuator may be actuated by a remote switch, wireless key fob, or other such device.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 4 is an isometric view of a portion of a pickup truck structure showing a resilient stop and a striker;

FIG. 5 is a cross sectional view of the resilient stop of FIG. 4 taken along the line V-V;

FIG. 6 is a cross sectional view of the striker of FIG. 4 taken along the line VI-VI;

FIG. 1;

DETAILED DESCRIPTION OF THE PREFERRED EMBODIMENTS

Figure 1:
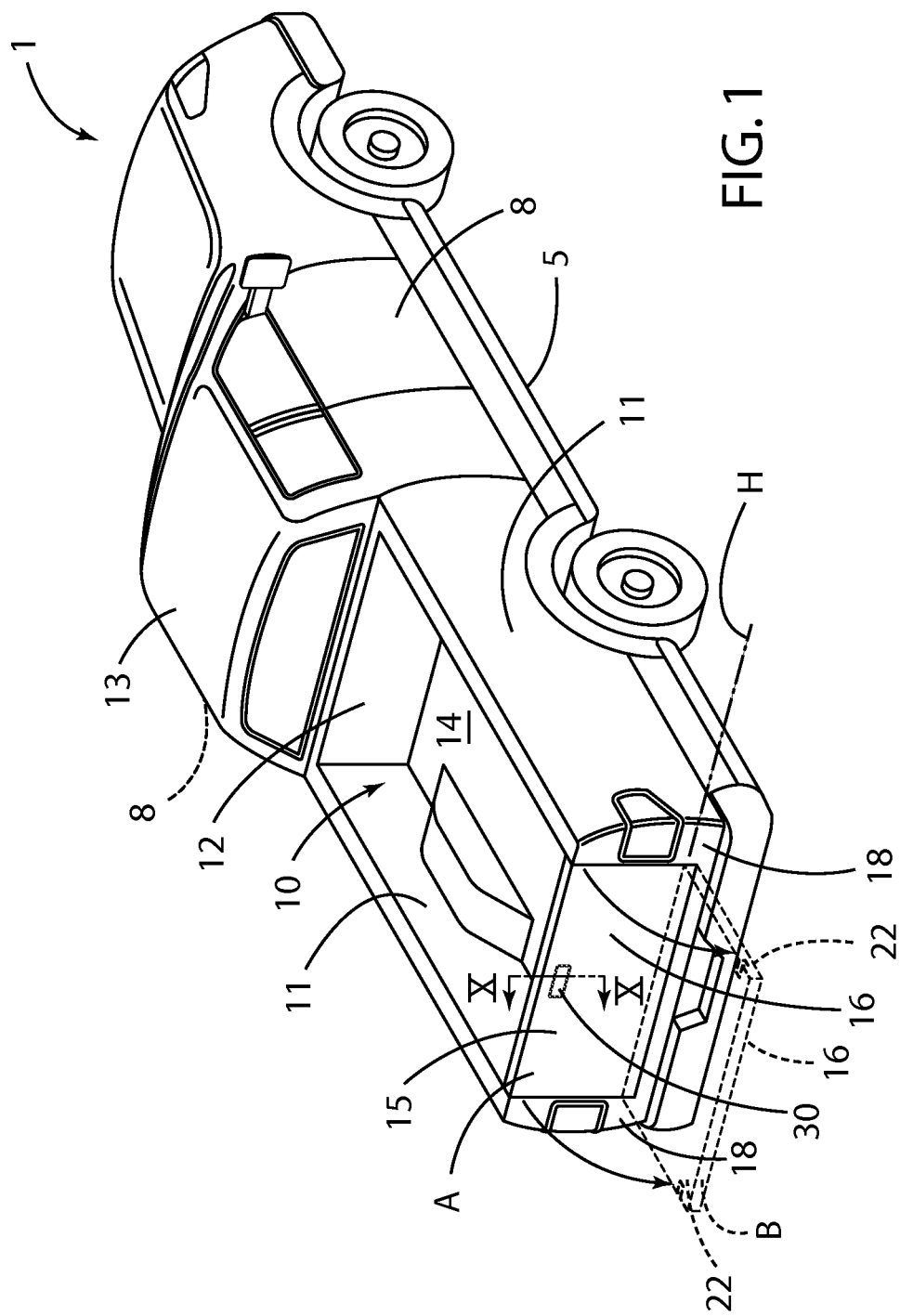
FIG. 1 is an isometric view of a pickup truck having a tailgate and powered latch according to one aspect of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

A pickup truck 1 includes a vehicle structure 5, a bed or box 10, and a tailgate 15 that selectively closes off opening 16 of box 10. The box 10 is defined by upright sidewalls 11, a front side surface 12 formed by a truck cab 13, and an upwardly facing bed or box surface 14.

Figure 2:
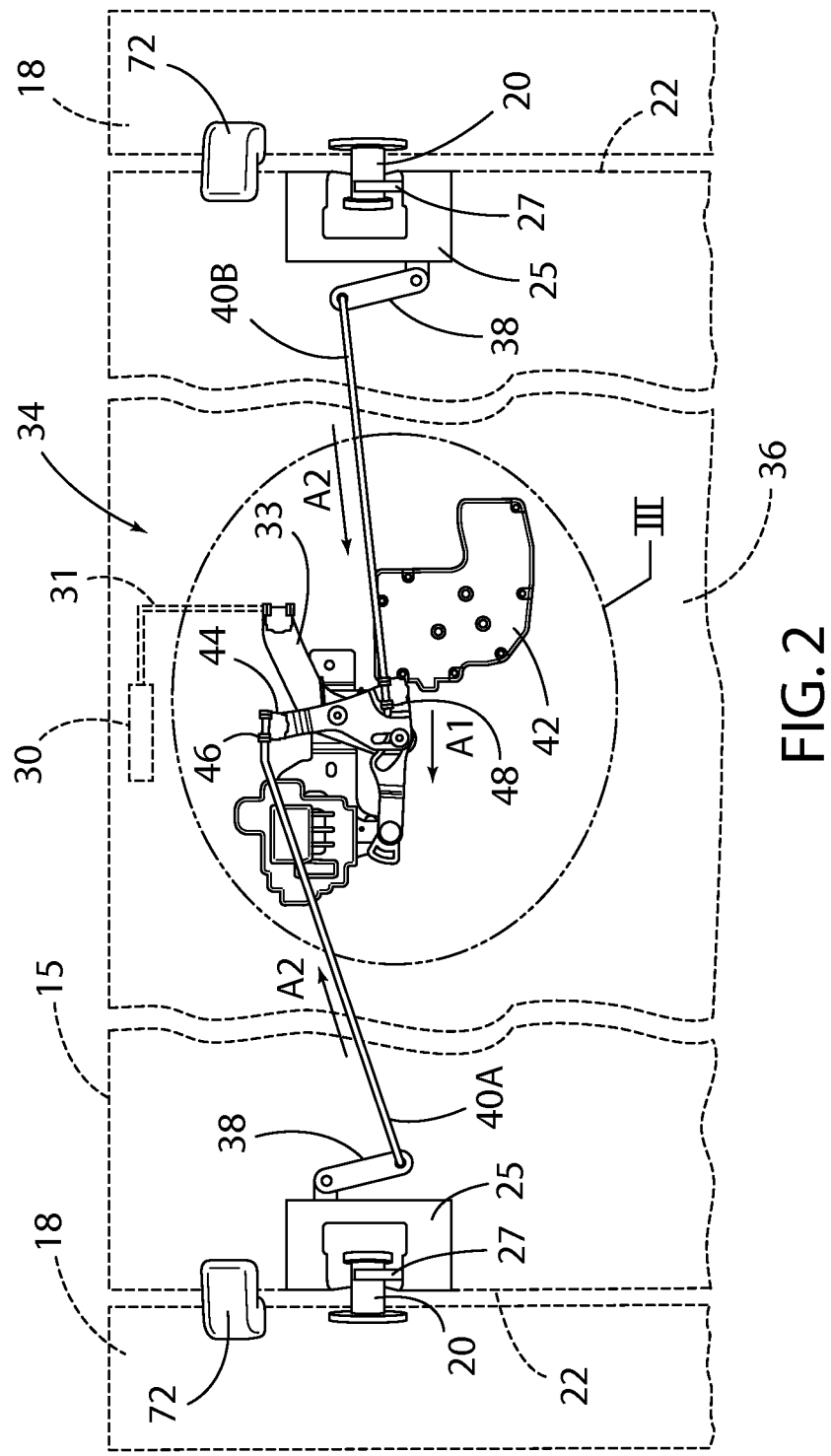
FIG. 2 is a partially fragmentary view of a tailgate and powered latch release according to the present invention.

The sidewalls 11 include upwardly extending rear edge portions 18 that interface with tailgate 15 when the tailgate 15 is in an upright, closed position "A." The tailgate 15 is rotatably mounted to the structure 5 for rotation about a generally horizontal axis "H." The tailgate 15 can be moved to a lowered, open position "B." Movement of tailgate 15 from position A to position B may be controlled by a damper mechanism as disclosed in U.S. Pat. No. 7,547,055, the entire contents of which are incorporated by reference. The damper mechanism generates a force that slows rotational movement of tailgate 15 about axis H as it opens. Damper mechanisms as disclosed in U.S. Pat. Nos. 6,874,837, 6,793,263, 6,769,729, and 7,551,958 may also be utilized to control opening of tailgate 15. With further reference to FIG. 2, a pair of strikers or pins 20 (see also FIGS. 4 and 6) extend inwardly from the rear edge portions 18 of sidewalls 11 towards opposite side edges 22 of tailgate 15. Latch mechanisms 25 include movable latch members 27 that are mounted in a fishmouth opening 28 (see also FIG. 7) in a side edge 22 of tailgate 15. The movable latch members 27 releasably engage the strikers 20 when the movable latch members are in a latched position, and the tailgate 15 is in the closed position A (FIG. 1). A handle 30 is movably mounted to the tailgate 15. In use, a user can manually open tailgate 15 by pulling on handle 30 to release latch mechanisms 25 to thereby permit the tailgate 15 to be moved from the closed position A to the open position B.

With reference to FIG. 2, a "brain plate" mechanism 34 is mounted to a central portion 36 of tailgate 15. Brain plate mechanism 34 provides for release of latch mechanisms 25 if handle 30 is actuated manually by a user, and also provides for release of latch mechanisms 25 if powered actuator 42 is remotely actuated by use of a key fob a switch inside cab 13, or other such remote device. Latch mechanisms 25 include latch release levers 38 that connect to first and second elongated connecting members or rods 40A and 40B, respectively. A powered actuator 42 (see also FIG. 3) acts on a lever 44 having an upper end 46 and a lower end 48. Upper end 46 of lever 44 is connected to first rod 40A, and lower end 48 of lever 44 is connected to second rod 40B. Actuation of powered actuator 42 causes lever 44 to rotate in a clockwise direction (FIGS. 2 and 3) about a pin or pivot 50, pulling rods 40A and 40B inwardly in the directions of the arrows "A2" (FIG. 2). Inward movement of rods 40A and 40B rotates latch release levers 38 to release latch mechanisms 25.

Figure 3:
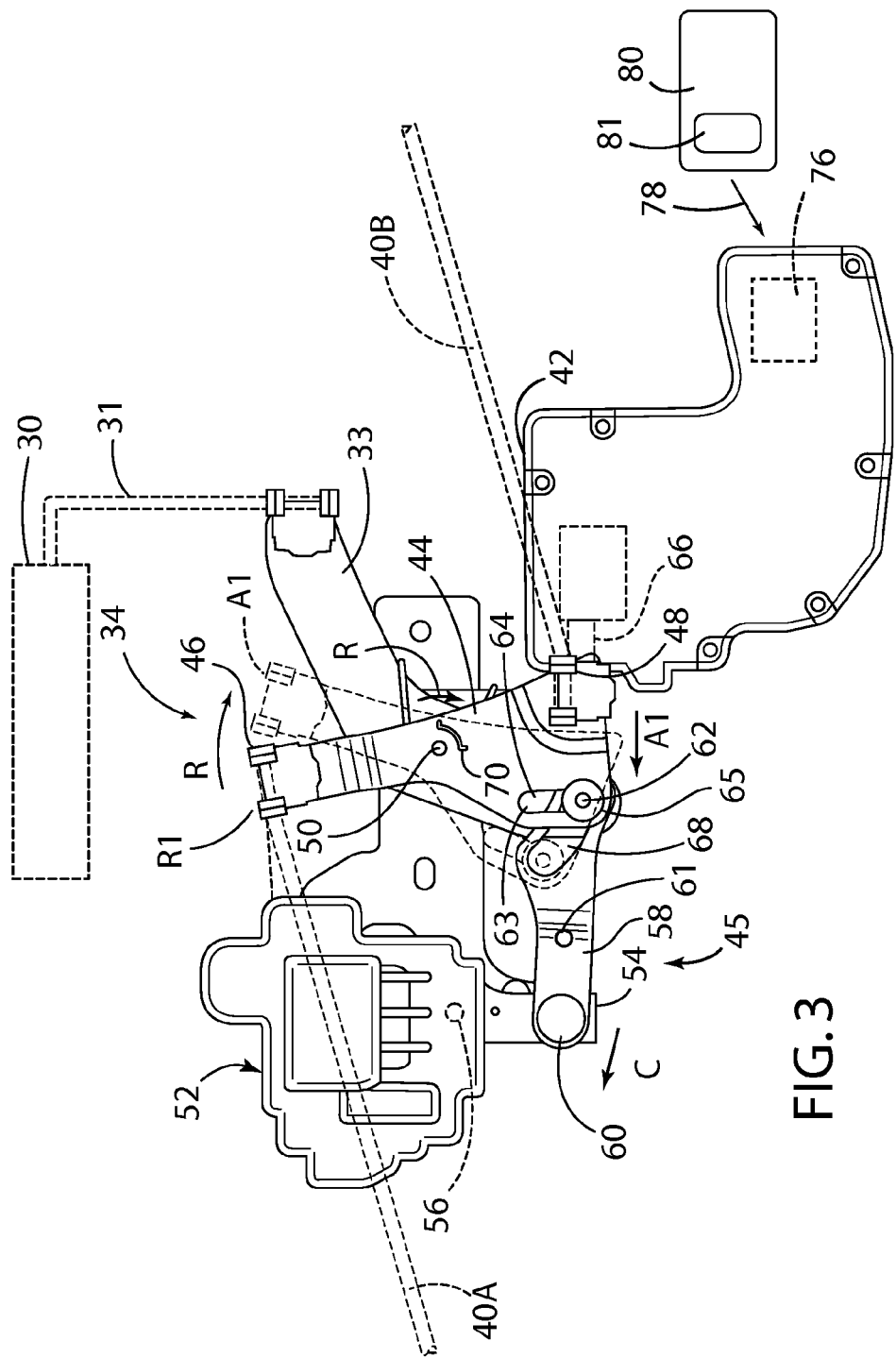
FIG. 3 is an enlarged view of a portion of the powered latch of FIG. 2.

A manual input lever 33 is operably connected to handle 30 by rod 31, such that operation of handle 30 shifts rod 31 downwardly causing manual release lever 33 to rotate in a clockwise direction (FIG. 3). This motion causes lever 44 to rotate about pin 50 in a clockwise direction as shown by the arrow "R," thereby releasing the latch mechanisms 25. Powered actuator 42 may be configured to push on lever 44 utilizing a rod 66 that is only capable of pushing, but not pulling, on lever 44. Rod 66 provides a "one way" push device that is capable of pushing/rotating lever 44 in a release direction R. However, rod 66 does not prevent rotation of lever 44 in the release direction R when handle 30 is manually actuated.

A powered locking actuator 52 (FIG. 3) has an output pin 54 that moves downwardly in a linear manner upon actuation of actuator 52. A lever 58 is pivotably mounted to a pin 61. Pin 54 pushes down on lever 58 such that lever 58 rotates about pin 61, causing a pin 62 to move to an upper end 63 of slot 64. When pin 62 is at the upper end 63 of slot 64, the mechanism is in a locked position wherein the release lever 33 is decoupled from the lever 44. When decoupled, lever 44 does not rotate with lever 33 when handle 30 is actuated. Thus, in the locked condition, actuation of handle 30 does not result in unlatching of latches 25. However, when the levers 33 and 34 are coupled (i.e. pin 62 is located at a lower end of 65 of slot 64), actuation of handle 30 rotates lever 33 causing lever 44 to rotate to release latches 25 to open the tailgate 15.

A torsion spring 70 biases lever 44 in a direction opposite the release direction R, such that release lever 44 returns to the rest or home position R1 upon release of handle 30, or retraction of rod 66 of powered actuator 42. Powered actuator 42 may comprise an electric motor, gears, solenoid, or other device having a linearly movable output member that operably engages lever 44 to provide for powered release of latch mechanisms 25.

With further reference to FIGS. 4 and 5, a resilient bumper or pad member 72 is mounted to the rear edge portion 18 of sidewalls 11 of truck 1. When the tailgate 15 is shifted to a closed position, movable latch members 27 engage strikers 20, and the edge portions 22 of tailgate 15 tightly abut resilient bumper 72 in an interference fit. This interference fit generates a force acting on tailgate 15 tending to shift the tailgate 15 from a fully closed position A (FIG. 1) to an open position B.

Figure 7:
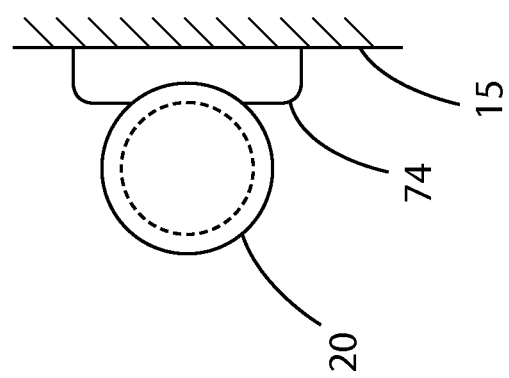
FIG. 7 is an isometric view of a portion of a side edge of a tailgate showing a latch disposed in a fishmouth opening.
Figure 8:
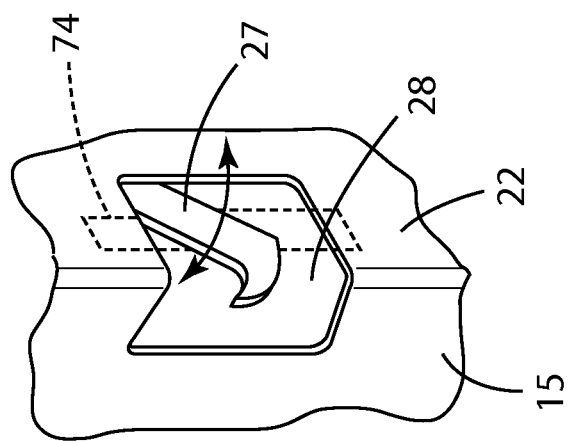
FIG. 8 is a partially fragmentary view of a striker engaging a resilient pad to bias the tailgate from the closed position towards the open position.

With further reference to FIGS. 6 and 7, tailgate 15 includes a movable latch member 27 that engages striker 20 to retain the tailgate 15 in fully closed position A. Tailgate latch 25 includes resilient members 74 that are mounted directly adjacent the movable latch members 27 inside fishmouth openings 28. With reference to FIG. 8, resilient pads 74 deformably contact strikers 20 when tailgate 15 is in a fully closed position A. This contact between striker 20 and resilient member 74 forms an interference fit generating a force tending to shift the tailgate 15 from the fully closed position A (FIG. 1) to the open position B.

In use, an operator generates a signal to the powered actuator 42 utilizing a switch such as a remote key fob or the like. The powered actuator 42 may include a receiver 76 (FIG. 3) that receives a signal 78 from key fob 80 upon actuation of button 81 on key fob 80. The powered actuator 42 is then actuated, and rod or actuation device 66 pushes on lever 44, thereby rotating lever 44 in the direction of the arrow R (FIG. 3), thereby shifting elongated connecting members 40A to 40B to thereby release latch mechanisms 25. The resilient bumper 72 and resilient member 74 together generate a force on tailgate 15 tending to open the tailgate 15. Upon release of the latch mechanisms 25, the door automatically swings from the closed position A to the open position B due to the forces generated by the resilient bumper 72 and resilient member 74, and also due to gravitational forces tending to rotate the tailgate 15 towards the open position B about a horizontal pivot axis H.

Figure 9:
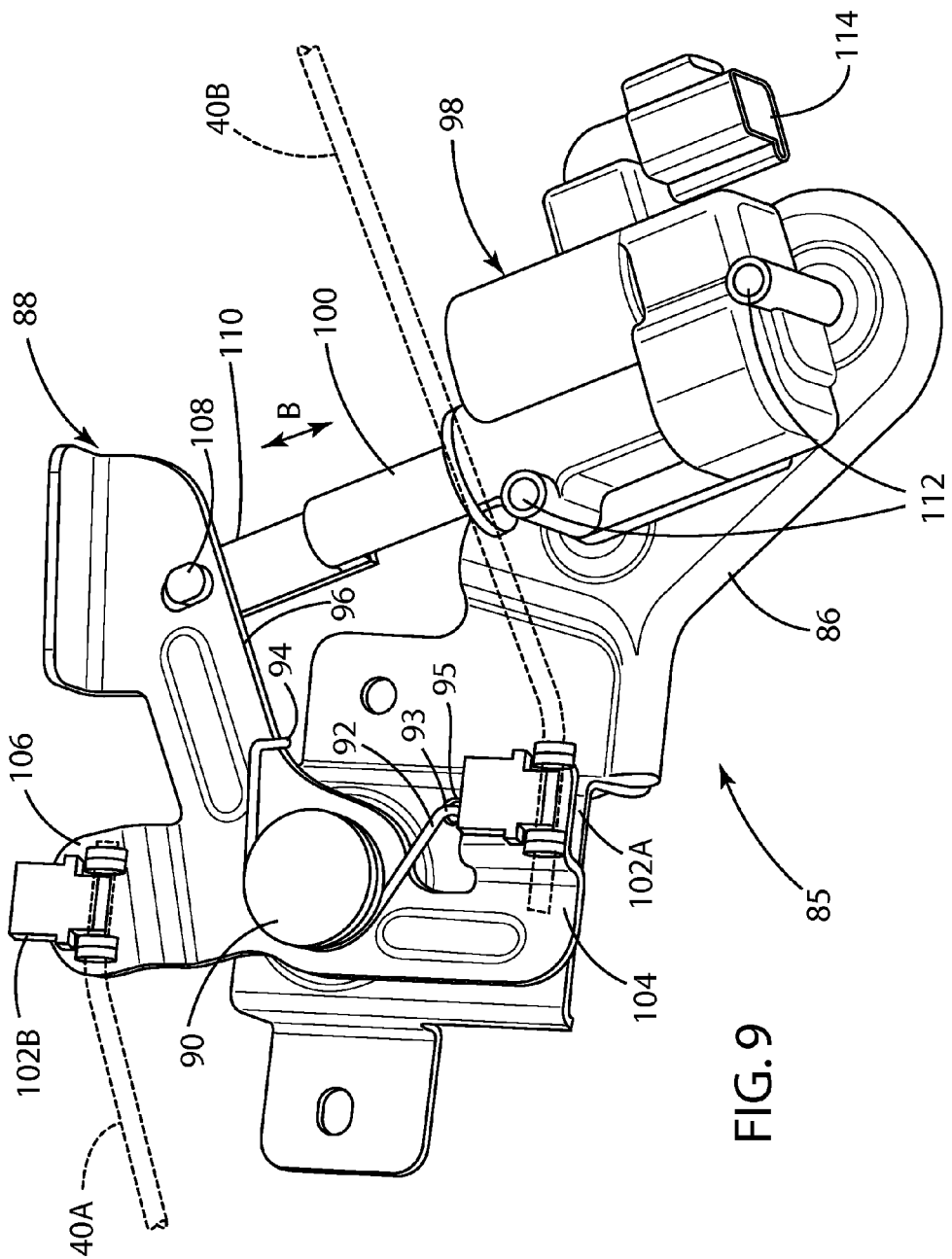
FIG. 9 is an enlarged view of a powered latch release according to another aspect of the present invention.

With further reference to FIG. 9, a powered latch release mechanism 85 according to another aspect of the present invention includes a base structure 86 that may be rigidly secured to tailgate 15 in substantially the same location as mechanism 34 as shown in FIG. 3. A lever 88 is rotatably mounted to base structure 86 by a pin or shaft 90. A torsion spring 92 includes a first end 93 that is received in an opening 95 of base structure 86. A second end 94 of torsion spring 92 contacts edge surface 96 of lever 88 to thereby rotationally bias lever 88 in a counterclockwise direction.

A powered actuator 98 includes an output member 100 that shifts linearly in the direction of the arrow "B." Powered actuator 98 is connected to base structure 86 by mechanical fasteners 112 or other suitable arrangement. An electrical connector 114 connects the powered actuator 98 to an electrical power supply, and also operably interconnects the powered actuator 98 to a controller. Powered actuator 98 may comprise a solenoid, an electric motor, or other suitable device. A pin 108 rotatably interconnects end 110 of output 100 to lever 88, such that actuation of powered actuator 98 causes lever 88 to rotate about pin 90. As noted above, torsion spring 92 biases lever 88 in a counterclockwise direction. Powered actuator 98 may be configured to provide powered motion only when retracting output member 100 to thereby overcome the torsional force generated by spring 92. Rotation in the counterclockwise direction of lever 88 may be accomplished by deactivating powered actuator 98, such that spring 92 causes lever 88 to rotate in a counterclockwise direction.

Lower end 104 of lever 88 includes a fitting 102A that interconnects lever 88 with rod 40A. Lever 88 also includes an upper end 106 having a fitting 102B that connects upper end 106 to elongated rod 40B. In use, powered actuator 98 controls rotation of lever 88 to thereby selectively pull on the rods 40A and 40B to thereby rotate latch levers 38 (FIG. 2) to release latches 25. Latch levers 38 and latches 25 operate in substantially the same manner as described above in more detail in connection with FIG. 2.

Figure 10:
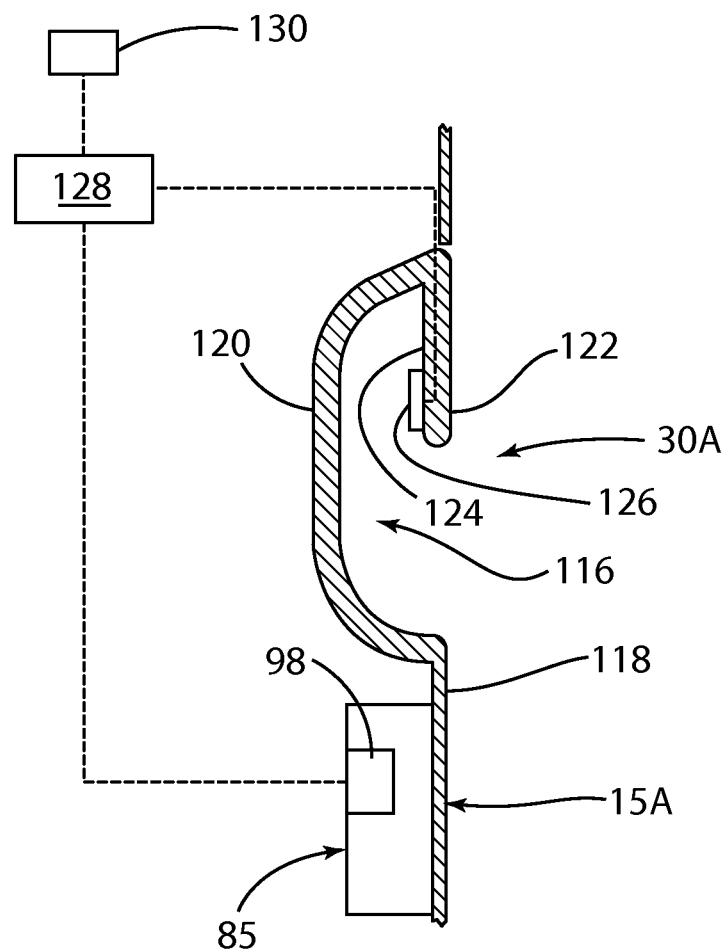
FIG. 10 is a cross-sectional view of a tailgate handle according to another aspect of the present invention taken along the line X-X.

With further reference to FIG. 10, a non-moving tailgate handle 30A may be utilized in connection with the powered latch release mechanism 85. The handle 30A comprises a pocket 116 formed in rear surface 118 of a tailgate 15A. Pocket 116 may comprise an inner chassis or reinforcing structure 120 that is secured to the internal tailgate structure. The handle 30A may include a downwardly extending wall or flap 122 having an inwardly facing surface 124. A membrane switch 126 is disposed on the inwardly facing surface 124. In use, a user inserts his or her fingers into pocket 116, and pushes on switch 126 to thereby actuate switch 126. This generates a signal to the controller 128. Controller 128 then actuates the powered actuator 98 to thereby unlatch the latch mechanisms 25. A user then pulls outwardly on the handle 30A to open the tailgate 15A.

The controller 128 is also operably connected to a lock/unlock switch or button 130. The lock/unlock switch 130 may be mounted in the vehicle interior on a vehicle door 8 (FIG. 1). Although the switch 130 could be mounted in various interior locations, in a preferred embodiment switch 130 is mounted to a driver's side vehicle door 8 in a location where it is readily accessible by an operator of the vehicle 1. The locked or unlocked state is stored in the memory of controller 128. In the event the membrane switch 126 is pushed when the tailgate is in a locked state, controller 128 will not cause powered actuator 98 to actuate and unlatch latches 25. If an operator pushes the button 130 to thereby shift the controller 128 to an unlocked state, controller 128 will cause actuator 98 to release latches 25 if a user actuates the membrane switch 126. The lock/unlock switch 130 may also comprise a switch such as the button 81 (FIG. 3) of a remote key fob 80, such that the unlock function can be performed using key fob 80.

Figure 11:
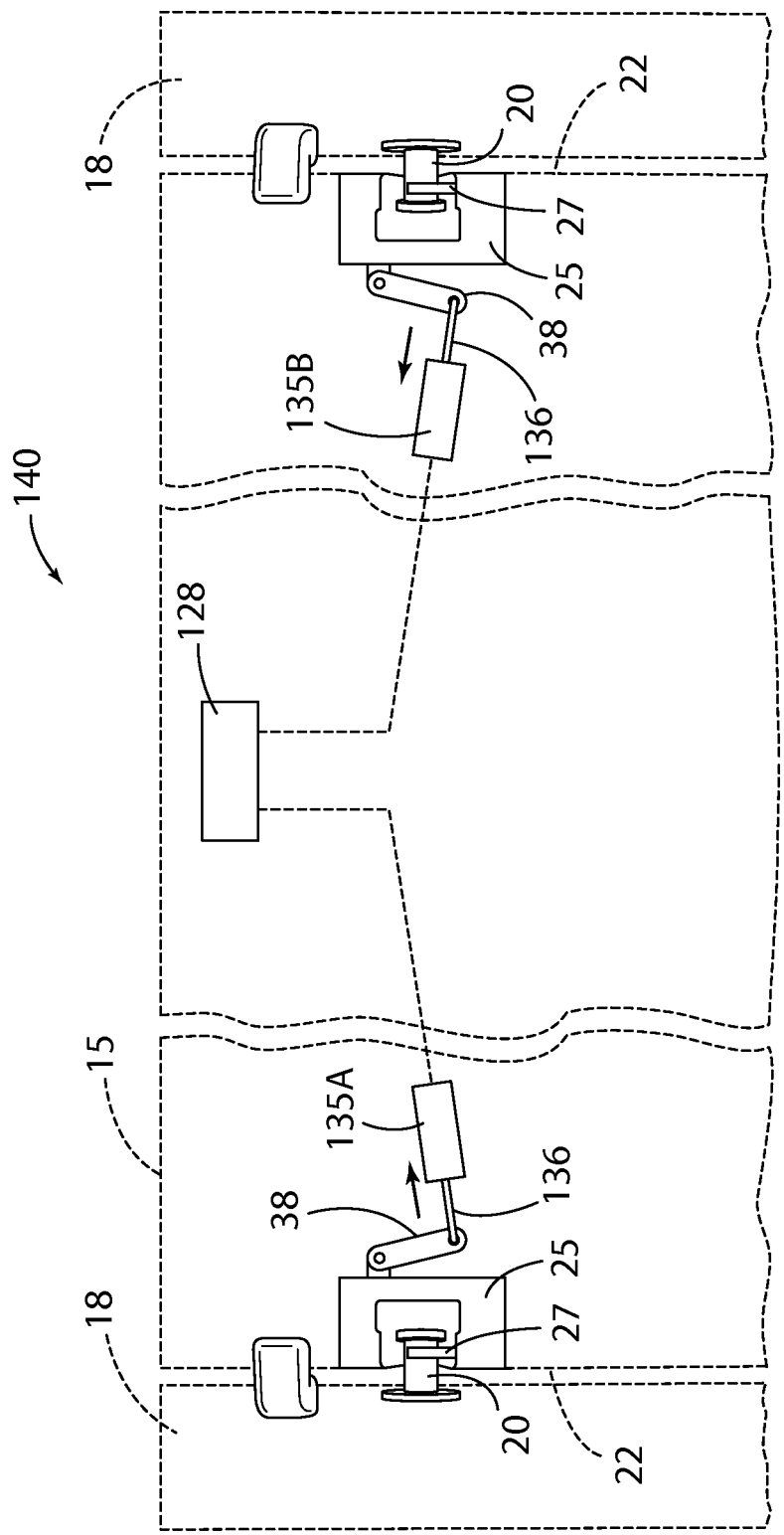
FIG. 11 is an enlarged view of a tailgate and power latch release according to another aspect of the present invention.

With further reference to FIG. 11, a powered tailgate latch release system 140 according to another aspect of the present invention includes first and second powered actuators 135A and 135B that are operably interconnected with latch levers 38 by linear output members 136. The powered actuators 135A and 135B may comprise solenoids, electric motors with gear drives or other suitable electrically powered mechanism. The powered actuators 135A and 135B are operably interconnected with the latch levers 38 by rod members 136. Actuation of the powered actuators 135A and 135B causes the rods 136 to shift linearly, thereby rotating latch levers 38 to selectively latch and unlatch the latches 25.

The powered actuators 135A and 135B are operably connected to a controller 128. Powered latch release 140 may be utilized in conjunction with a non-moving handle 30A as described in more detail above in connection with FIG. 10. The locked and unlocked states of the powered latch release system 140 may be stored in the memory of controller 128, and a switch 130 in the vehicle interior compartment can be used to switch between the locked and unlocked states. Similarly, a pushbutton on a remote key fob 80 (FIG. 3) may also be utilized to switch between the locked and unlocked states. Controller 128 may be configured to actuate the powered actuator 135A and 135B upon actuation of membrane switch 126 only if controller 128 is an unlocked state.

It is to be understood that variations and modifications can be made on the aforementioned structure without departing from the concepts of the present invention, and further it is to be understood that such concepts are intended to be covered by the following claims unless these claims by their language expressly state otherwise.

We claim:

1. A powered latch system for selective release of a tailgate of a pickup truck of the type that includes a vechilce structure including an upwardly-facing box and upstanding sidewalls extending along opposite sides of the box structure to define a generally upright rear box opening and a tailgate movably mounted to the vehicle structure for movement between an upright closed position and a generally horizontal open position, the powered latch system comprising:

first and second latches having first and second latch members, respectively, that are movable between latched and released positions, the first and second latch members adapted to retain a tailgate in the closed position when the first and second latches are in their latched positions;

at least one resilient member that is adapted to interact with a tailgate and bias a tailgate towards the open position when a tailgate is in the closed position and the latches are in the latched position;

at least one powered actuator operably connected to the first and second latches to selectively shift the first and second latches from their respective latched positions to their respective released positions, whereby a tailgate automatically shifts from its upright closed position to its open position upon actuation of the powered actuator.

2. The powered latch system of claim 1, wherein:

the powered actuator is adapted to be mounted to a central portion of a tailgate, and wherein the powered actuator is operably connected to the first and second latches by at least one elongated connecting member.

3. The powered latch system of claim 2, wherein:

the one elongated connecting member comprises first and second elongated connecting members operably interconnecting the first and second latches, respectively, to the powered actuator; and including:

a tailgate having a pivotable lever operably interconnecting the powered actuator to the first and second elongated connecting members.

4. The powered latch system of claim 3, including:

a handle movably mounted to the tailgate, and wherein the handle is operably connected to the first and second latches whereby movement of the handle shifts the first and second elongated connecting members and releases the first and second latches.

5. The powered latch system of claim 4, wherein:

the powered actuator is operably connected to the first and second latches whereby the powered actuator shifts the first and second elongated connecting members and releases the first and second latches without movement of the handle.

6. The powered latch system of claim 5, including:

first and second strikers adapted to be rigidly mounted to a vehicle structure adjacent a rear box opening;

the first and second latch members are adapted to engage the strikers to retain the tailgate in its closed position; and wherein:

the resilient member comprises first and second resilient members mounted to the tailgate adjacent the first and second latch members, respectively, and wherein the first and second resilient members are adapted to contact the first and second strikers, respectively, when the tailgate is closed.

7. The powered latch of claim 1, wherein:

the one powered actuator comprises a first powered actuator connected to the first latch and a second powered actuator connected to the second latch.

8. The powered latch of claim 1, including:

a damper mechanism adapted to generate a force tending to slow movement of a tailgate from its closed position to its open position.

9. A tailgate assembly, comprising:

first and second strikers;

a tailgate having movable latch members at opposite side edges thereof adapted to releasably engage the strikers;

a powered actuator operably interconnected with the latch members;

a remote switch configured to actuate the actuator from inside a vehicle;

resilient members mounted on the tailgate and deformably engaging the strikers to push the tailgate open automatically upon release of the latches by the powered actuator.

10. The tailgate assembly of claim 9, wherein:
the tailgate includes a tailgate structure defining a generally quadrilateral perimeter with opposite side edges defining openings therein, and upper and lower edges extending between the opposite side edges, and wherein the latch members are mounted to the tailgate structure in the openings at the opposite side edges, and wherein the resilient members are mounted within the openings adjacent the latch members whereby the latch members retain the strikers in tight engagement with the resilient members.

11. The tailgate assembly of claim 10, including:
a release lever pivotably mounted to the tailgate structure for rotation about an axis;
first and second elongated members operably interconnecting the release lever to the latch members whereby movement of the handle or actuation of the powered actuator rotates the release lever and shifts the first and second elongated members to selectively shift the latch members from engaged positions to disengaged positions.

12. The tailgate assembly of claim 11, wherein:
the release lever includes upper and lower opposite ends, and wherein the first and second elongated members are connected to the upper and lower ends, respectively, such that rotation of the release lever in a first direction simultaneously shifts the first and second elongated members inwardly to release the latch members.

13. The tailgate assembly of claim 12, including:
a receiver operably connected to the powered actuator, wherein the receiver is configured to generate a signal that actuates the powered actuator if the receiver receives a signal from a portable key fob.

14. A method of opening a tailgate of a pickup truck of the type having a structure, a box, and a tailgate that moves between open and closed positions relative to the box, the method comprising:
providing a releasable latch mechanism adapted to selectively retain the tailgate in its closed position when the latch mechanism is in a latched state;
biasing the tailgate away from the closed position whereby the tailgate automatically moves towards its open position upon releasing the latch mechanism;
providing a powered actuator that releases the latch mechanism upon receiving a signal from a remote source, whereby the tailgate automatically moves from its closed position to its open position upon actuation of a remote source by a user, even if a user does not pull on the tailgate.

15. The method of claim 14, wherein:
biasing the tailgate away from the closed position includes providing resilient members that deform upon contact with the tailgate and the structure when the tailgate is closed.

16. The method of claim 15, wherein:
the structure includes strikers that are engaged by the latch mechanism when the latch mechanism is in the latched state and the tailgate is in the closed position, and wherein the resilient members engage the strikers to bias the tailgate from the closed position to the open position.

17. The method of claim 16, wherein:
the tailgate includes a rotatable lever that operably interconnects the powered actuator with the releasable latch mechanism; and including:
utilizing the powered actuator to rotate the lever.

18. The method of claim 15, wherein:
The remote source comprises a switch disposed in an interior of the pickup truck adjacent a driver's side seat.

* * * * *

UNITED STATES PATENT AND TRADEMARK OFFICE
CERTIFICATE OF CORRECTION

PATENT NO. : 8,532,873 B1
APPLICATION NO. : 13/674502
DATED : September 10, 2013
INVENTOR(S) : Charles Gregory Bambenek et al.

It is certified that error appears in the above-identified patent and that said Letters Patent is hereby corrected as shown below:

Title Page

Item (73) Assignee:
"Ford Global Technologies, LL" should be --Ford Global Technologies, LLC--

Signed and Sealed this
Eighteenth Day of March, 2014

Michelle K. Lee
*Deputy Director of the United States Patent and Trademark Office*